US012790698B2

(12) United States Patent
Sakurai et al.

(10) Patent No.: US 12,790,698 B2
(45) Date of Patent: Nov. 10, 2026

(54) GAS-LIQUID SEPARATION DEVICE, GAS-LIQUID SEPARATION METHOD, ELECTROLYSIS DEVICE, AND ELECTROLYSIS METHOD

(71) Applicant: Japan Aerospace Exploration Agency, Tokyo (JP)

(72) Inventors: Masato Sakurai, Tokyo (JP); Motohiko Sato, Kanagawa (JP); Tatehiro Shimizu, Kanagawa (JP)

(73) Assignee: JAPAN AEROSPACE EXPLORATION AGENCY, Tokyo (JP)

(*) Notice: Subject to any disclaimer, the term of this patent is extended or adjusted under 35 U.S.C. 154(b) by 604 days.

(21) Appl. No.: 18/267,183

(22) PCT Filed: Mar. 2, 2022

(86) PCT No.: PCT/JP2022/008941
§ 371 (c)(1),
(2) Date: Jun. 14, 2023

(87) PCT Pub. No.: WO2022/186291
PCT Pub. Date: Sep. 9, 2022

(65) Prior Publication Data

US 2024/0011164 A1 Jan. 11, 2024

(30) Foreign Application Priority Data

Mar. 3, 2021 (JP) ................................ 2021-033479

(51) Int. Cl.
*B01D 63/08* (2006.01)
*B01D 19/00* (2006.01)
(Continued)

(52) U.S. Cl.
CPC ............ *C25B 1/04* (2013.01); *B01D 19/0031* (2013.01); *B01D 63/08* (2013.01); *C25B 9/60* (2021.01)

(58) Field of Classification Search
CPC ...................................................... B01D 63/08
See application file for complete search history.

(56) References Cited

U.S. PATENT DOCUMENTS

| | | |
|---|---|---|
| 4,515,606 A | 5/1985 | de Winter |
| 4,525,182 A | 6/1985 | Rising et al. |

(Continued)

FOREIGN PATENT DOCUMENTS

| | | |
|---|---|---|
| CN | 1488419 A * | 4/2004 |
| CN | 102301091 A | 12/2011 |

(Continued)

OTHER PUBLICATIONS

Dongguo Li et al., "Highly Quaternized Polystyrene lonomers for High Performance Anion Exchange Membrane Water Electrolysers", Nature Energy, Nature Publishing Group UK, London, vol. 5, No. 5, Mar. 9, 2020, pp. 378-385, 8 pages.

(Continued)

*Primary Examiner* — Robert A Hopkins
(74) *Attorney, Agent, or Firm* — Cooper Legal Group LLC

(57) ABSTRACT

A gas-liquid separation device 1 that separates gas and liquid from a gas-liquid multiphase fluid comprises a hydrophobic enclosure for the multiphase fluid formed by a hydrophobic membrane that allows only the gas in the multiphase fluid to pass through, and a fluid flow channel 400 that supplies the multiphase fluid to the hydrophobic enclosure.

8 Claims, 8 Drawing Sheets

(51) Int. Cl.
*C25B 1/04* (2021.01)
*C25B 9/60* (2021.01)

(56) References Cited

U.S. PATENT DOCUMENTS

| | | | | |
|---|---|---|---|---|
| 5,989,318 | A | 11/1999 | Schroll | |
| 6,287,431 | B1 | 9/2001 | Murphy et al. | |
| 6,712,951 | B2 * | 3/2004 | Andrews | C01B 13/10 205/633 |
| 8,596,996 | B2 | 12/2013 | Herz et al. | |
| 10,106,899 | B2 * | 10/2018 | Fray | C25B 9/19 |
| 2013/0062215 | A1 | 3/2013 | Kurashina et al. | |

FOREIGN PATENT DOCUMENTS

| | | | |
|---|---|---|---|
| CN | 102348895 | A | 2/2012 |
| CN | 109680290 | A | 4/2019 |
| CN | 111699279 | A | 9/2020 |
| JP | 4636315 | B2 | 10/1971 |
| JP | S5485478 | A | 7/1979 |
| JP | 57-167705 | A | 10/1982 |
| JP | S60502091 | A | 12/1985 |
| JP | H1080602 | A1 | 3/1998 |
| JP | 2002028422 | A | 1/2002 |
| JP | 2003113487 | A | 4/2003 |
| JP | 3202182 | U | 1/2016 |
| JP | 2016027261 | A | 2/2016 |
| WO | 8500987 | A1 | 3/1985 |

OTHER PUBLICATIONS

Corresponding European Patent Application No. 22763344.3, Extended European Search Report, date mailed Jul. 25, 2024, 14 pages.
Corresponding European Patent Application No. 25159244.0, European Search Report, dated May 30, 2025, 13 pages.
Corresponding EP Patent Application No. 22763344.3, Partial European Search Report, date mailed Apr. 19, 2024, 10 pages.
Corresponding International Patent Application No. PCT/JP2022/008941, International Search Report, date mailed May 24, 2022, 10 pages.
Corresponding European Patent Application No. 22763344.3, European Search Report, date mailed Mar. 6, 2025, 5 pages.
Corresponding Chinese Patent Application No. 202280008615.1, Office Action dated May 26, 2026, 20 pages.
Corresponding European Patent Application No. 25159244.0, Office Action, dated Mar. 16, 2026, 6 pages.

* cited by examiner

GAS-LIQUID SEPARATION DEVICE, GAS-LIQUID SEPARATION METHOD, ELECTROLYSIS DEVICE, AND ELECTROLYSIS METHOD

TECHNICAL FIELD

Embodiments of the present invention relate to a technology for separating gas and liquid from a multiphase fluid.

BACKGROUND ART

The gas-liquid separation device shown in Patent Literature 1 below is known as a gas-liquid separation device for separating gas and liquid from a multiphase fluid of gas and liquid. In the gas-liquid separation device shown in this document, swirl blades are disposed in a toroidal space defined by a casing and an exhaust pipe, and the upper part of the toroidal space is connected to an inlet, and the exhaust pipe is connected to the outlet at the upper part through its inner space. A swirl chamber is provided below the toroidal space, a liquid reservoir is provided below the swirl chamber, and a gap for liquid passage is provided between the outer edge of a partition member and the inner circumference wall of the casing. In this gas-liquid separation device, a multiphase fluid entering from the inlet is swirled by the swirl blades, and the liquid is separated and driven outward by the effect of centrifugal force, and flows down along the inner circumferential wall surface of the casing and through the gap into the liquid reservoir. On the other hand, the gas passes through the lower end of the exhaust pipe and flows out through the outlet.

CITATION LIST

Patent Document

Patent document 1: JP2002-028422

DISCLOSURE OF THE INVENTION

Problems to be Solved by the Invention

The gas-liquid separation devices described above have the problem of increasing the size of the apparatus because they require a toroidal space with swirl blades, a swirl chamber, a liquid reservoir, etc.

The problem solved by the present invention is to realize a technology that can provide apparatus in smaller sizes.

Means for Solving the Problems

An aspect of the present invention that solves the above-mentioned problem is a gas-liquid separation device that separates liquid and gas from a gas-liquid multiphase fluid comprising a hydrophobic enclosure for the multiphase fluid formed by a hydrophobic membrane that allows only the gas in the multiphase fluid to pass through, and a supply channel that supplies the multiphase fluid to the hydrophobic enclosure.

Another aspect of the present invention is an electrolysis device that generates a gas by electrolyzing a liquid supplied to an electrolyte membrane between an anode-side electrode section and a cathode-side electrode section, comprising a liquid supply chamber in which the cathode-side electrode section is located and to which the liquid is supplied, a hydrophobic membrane that forms a part of the walls of the liquid supply chamber and that allows only a gas generated by the electrolysis on the cathode side of the electrolyte membrane to pass therethrough, and a discharge channel that discharges the gas that has passed through the hydrophobic membrane to the outside.

BEST MODE FOR CARRYING OUT THE INVENTION

Embodiments of the present invention will be described below with reference to the drawings. Throughout the description and the drawings, elements having substantially the same functionality are given the same reference numbers to avoid redundant explanations.

First Embodiment

Figure 1:
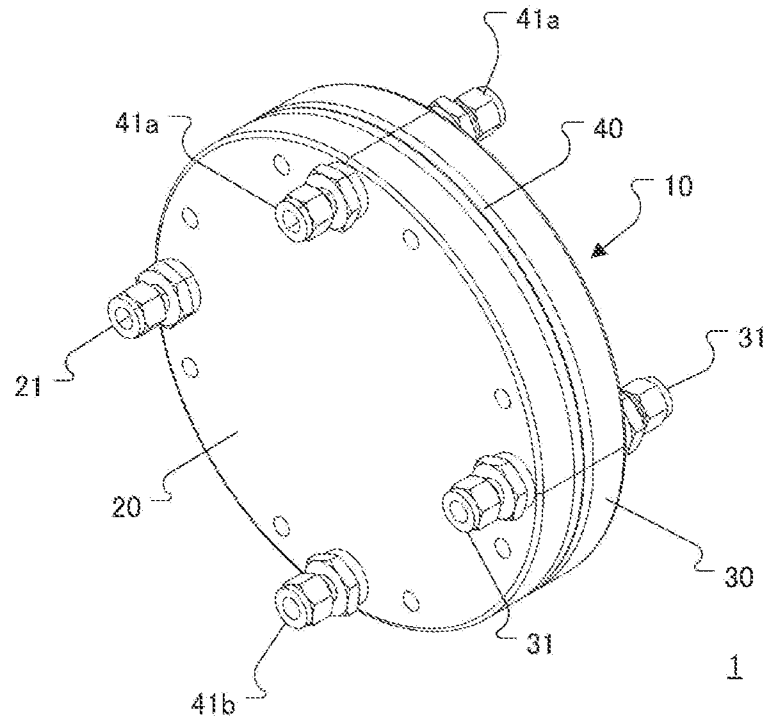
FIG. 1 is a perspective view illustrating the gas-liquid separation device of the first embodiment.
Figure 2:
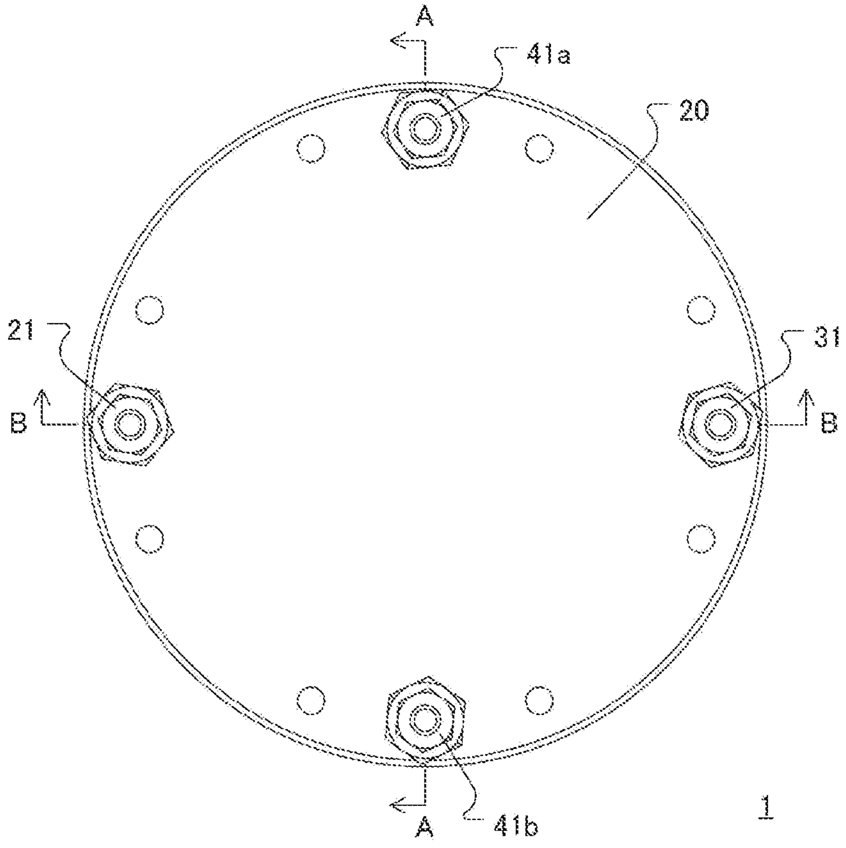
FIG. 2 is a front view illustrating the gas-liquid separation device of the first embodiment.
Figure 3:
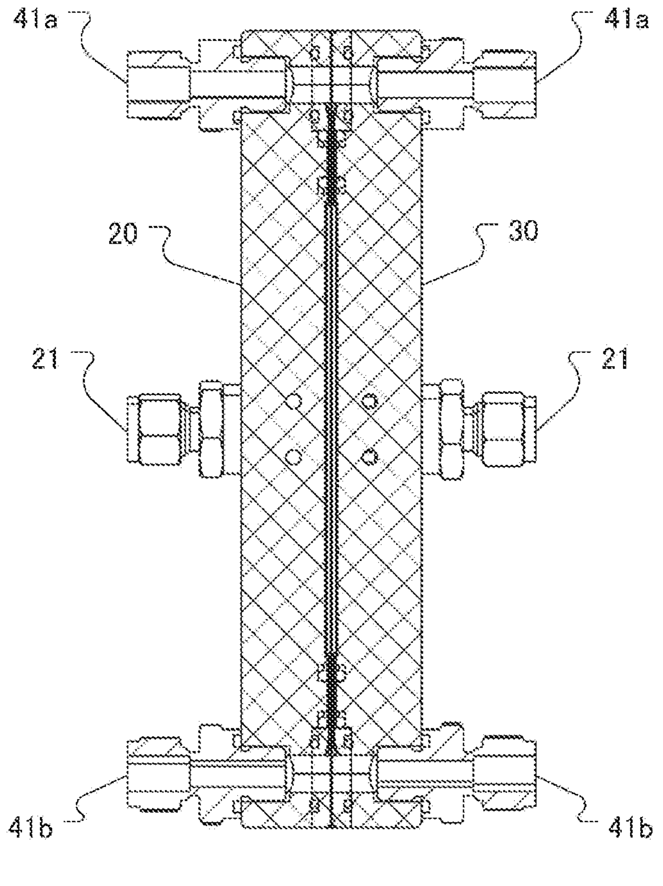
FIG. 3 shows the cross section of the A-A line in FIG. 2.
Figure 4:
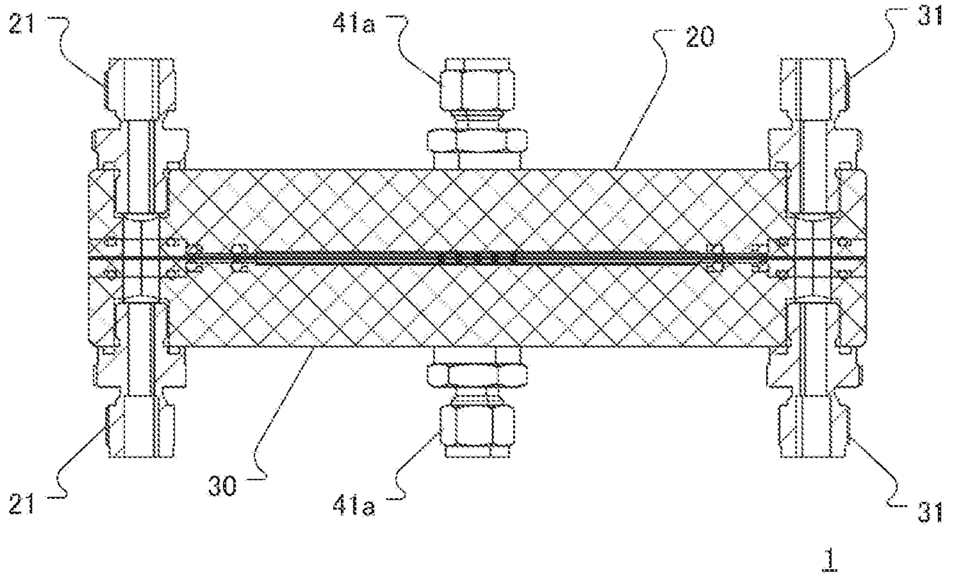
FIG. 4 shows the cross section of the B-B line in FIG. 2.

The configuration of a gas-liquid separation device of the present embodiment will be described. In the following description, the multiphase fluid to be separated by the gas-liquid separation device of the embodiment is assumed to be a gas-liquid two-phase fluid in which a liquid such as water and a gas (in bubbles) such as air or water vapor are mixed in a multiphase manner. FIGS. 1 and 2 are a perspective view and a front view of the gas-liquid separation device of the embodiment. FIGS. 3 and 4 show the cross sections of the A-A and B-B lines in FIG. 2.

As shown in FIG. 1, the gas-liquid separation device 1 has a liquid-side plate 20 located at the front side of the device, a gas-side plate 30 located at the rear side of the device, and a gas-liquid mixture plate 40 located between and connected to these plates, each of which is formed in a generally disk shape. The plates are stacked and integrally joined by fasteners such as bolts and nuts. Since the plates are integrally joined, channels are defined between the plates into each of which the multiphase fluid, the liquid separated from the multiphase fluid, and the gas separated from the multiphase fluid flow separately. Details of the channels will be described later.

The liquid-side plate 20 has two inlet/outlet ports 41*a* and 41*b*, a liquid outlet port 21, and a gas outlet port 31 at the periphery of its flat front surface, as shown in FIGS. 1 and 2. Hereinafter, when it is not necessary to distinguish between these ports, they will be referred to only as a port or ports. Each port has a generally cylindrical shape projecting outwardly from the surface of the liquid-side plate 20, and in this embodiment, they are arranged at equal intervals clockwise in the circumferential direction of the liquid-side plate 20 in the order of the inlet/outlet port 41*a*, the gas outlet port 31, the inlet/outlet port 41*b*, and the liquid outlet port 21.

The gas-side plate 30 has two inlet/outlet ports 41*a* and 41*b*, a liquid outlet port 21, and a gas outlet port 31 at the periphery of its flat rear surface, as shown in FIGS. 3 and 4. These ports are of the same type as the ports on the liquid-side plate 20 and are arranged on the opposite side with respect to the ports on the liquid-side plate 20. The same type of ports at corresponding positions on the front and rear sides of the gas-liquid separation device 1, i.e., on the liquid-side plate 20 and the gas-side plate 30, may be used in pairs or only either one of them may be used.

Each of the pair of inlet/outlet ports 41*a* and 41*b* communicates with a fluid flow channel 400 described below (see FIG. 5) to supply and discharge multiphase fluid to and from the device. In use, the ports are connected, for example, to an unshown pump that delivers a multiphase fluid. In this embodiment, the multiphase fluid is supplied through both the inlet/outlet ports 41*a* and 41*b*, and separated into gas and liquid within the device. Alternatively, when the multiphase fluid is supplied into the device only through the inlet/outlet port 41*a*, the multiphase fluid may be discharged from the inlet/outlet port 41*b* and recirculated, or the inlet and the outlet may be reversed. Alternatively, the multiphase fluid may be supplied through either one of inlet/outlet ports 41*a* or 41*b* and the other port may be closed.

Each of the pair of liquid outlet ports 21 communicates with a liquid flow channel 200, described below (see FIG. 5), located within the gas-liquid separation device 1 to discharge the liquid separated from the multiphase fluid to the outside of the device. Each of the pair of gas outlet ports 31 communicates with a gas flow channel 300, described below (see FIG. 5), located within the gas-liquid separation device 1 to discharge the gas separated from the multiphase fluid to the outside of the device. The discharged liquid and gas are each collected in a container or the like provided outside the gas-liquid separation device 1.

Internal Configuration of Gas-Liquid Separation Device 1

Figure 5:
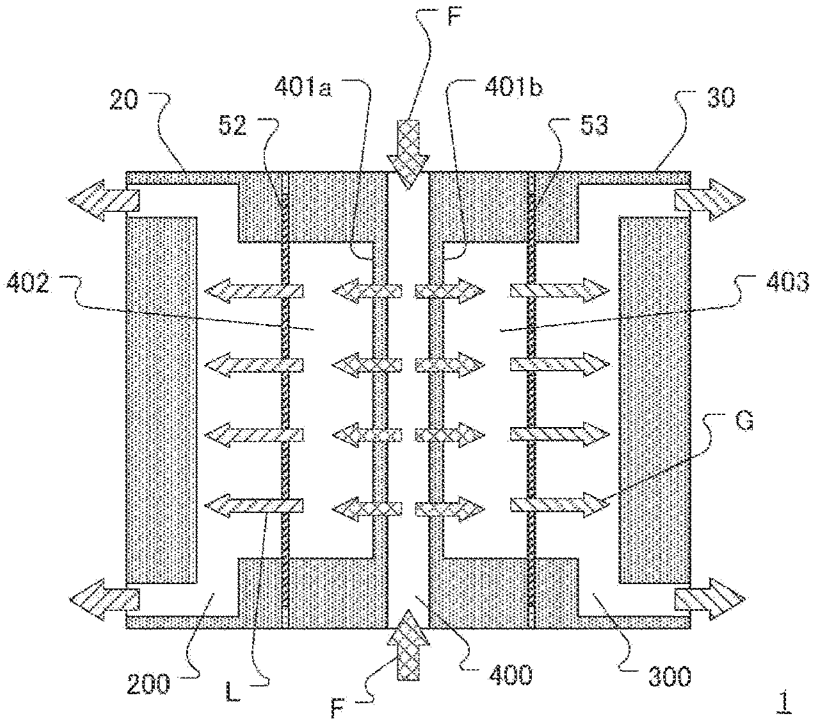
FIG. 5 is a schematic diagram describing the internal configuration of the gas-liquid separation device and fluid flow.

A detailed description of the internal configuration of the flow channels and other components formed in the gas-liquid separation device 1 is given with reference to FIG. 5. FIG. 5 is a schematic diagram describing the internal configuration of the gas-liquid separation device and the fluid flow. Hereinafter, the direction of the front side of the gas-liquid separation device 1 is referred to as the forward direction, and the direction of the rear side is referred to as the backward direction.

As shown in FIG. 5, a pair of partitions 401*a* and 401*b* formed in the shape of disks and spaced parallel to each other are provided within the gas-liquid mixture plate 40. A fluid flow channel 400 is defined between the pair of partitions 401*a* and 401*b*. The pair of partitions 401*a* and 401*b* are provided with a plurality of unshown through-holes through which the multiphase fluid may pass. Inflow chambers 402 and 403 into which the multiphase fluid can flow through the through-holes are defined between the partition 401*a* and the liquid-side plate 20 and between the partition 401*b* and the gas-side plate 30, respectively.

The inflow chamber 402 is in contact at its front side with one of the surfaces of a hydrophilic membrane 52 formed in a disk-shape, that is fixed by a separator or the like, not shown in the figure, between the liquid-side plate 20 and the gas-liquid mixture plate 40. Thus, the inflow chamber 402, together with the fluid flow channel 400, functions as a supply channel for supplying the multiphase fluid to the hydrophilic membrane 52.

The hydrophilic membrane 52 is a porous thin film made of a highly hydrophilic material that forms a wall of the inflow chamber 402, thereby forming a hydrophilic enclosure for the multiphase fluid. Therefore, in this embodiment, when wetted, the hydrophilic membrane 52 allows only the liquid in the multiphase fluid to permeate and pass through. Any known material may be used for the hydrophilic membrane 52 for passing only liquids as described above.

Within the liquid-side plate 20 on the front side of the hydrophilic membrane 52, a liquid flow channel 200 is formed to allow the liquid that has passed through the hydrophilic membrane 52, i.e., after the gas has been separated from the multiphase fluid, to flow in and to discharge the liquid to the outside. In other words, the hydrophilic membrane 52 forms one of the walls of the liquid flow channel 200.

The inflow chamber 403 is in contact at its rear side with one of the surfaces of a hydrophobic membrane 53 formed in a disk-shaped sheet, which is fixed by a separator or the like, not shown in the figure, between the gas-side plate 30 and the gas-liquid mixture plate 40. Thus, the inflow chamber 403, together with the fluid flow channel 400, functions as a supply channel for supplying the multiphase fluid to the hydrophobic membrane 53.

The hydrophobic membrane 53 is a porous thin film with gas permeability that forms one of the walls of the inflow chamber 403, thereby forming a hydrophobic enclosure for the multiphase fluid. This means that, in this embodiment, the hydrophobic membrane 53 allows only gases contained in the multiphase fluid to pass through without allowing liquids to pass through. Any known hydrophobic material may be used for the hydrophobic membrane 53 described above. An example is Gore-Tex (registered trademark) manufactured by WL Gore & Associates, Inc. from ePTFE (expanded polytetrafluoroethylene). The type of hydrophobic membrane 53 may be selected according to the environment in which it will be used, and may be either an organic or inorganic membrane. Examples of such inorganic membranes include ceramic membranes such as zeolite, silica, alumina, zirconia, and titania membranes, and carbon membranes. Examples of such organic membranes include fluoropolymer membranes such as PTFE (polytetrafluoroethylene) and PVDF (polyvinylidene fluoride) membranes, polyamide, cellulose acetate, polyimide, and polyethylene membranes. Alternatively, a porous material that has been made water-repellent may be used as a hydrophobic membrane.

Within the gas-side plate 30 on the rear side of the hydrophobic membrane 53, a gas flow channel 300 is formed to allow the gas that has passed through the hydrophobic membrane 53, i.e., after the liquid has been separated from the multiphase fluid, to flow in and discharge the gas to the outside.

The hydrophilic membrane 52 and the hydrophobic membrane 53 are made in the form of sheets and are arranged facing each other and separated from each other. Preferably, the separation distance should be less than a predetermined distance. The separation distance may be a distance based on the size of the bubbles in the multiphase fluid. By setting the separation distance smaller than the bubble size, the gas bubbles contained in the multiphase fluid can come into contact with both the hydrophilic membrane 52 and the hydrophobic membrane 53, allowing the gas to rapidly pass into the gas flow channel 300. Preferably, the distance should be about 1 mm to allow the multiphase fluid and the bubbles to contact the hydrophobic membrane 53. Therefore, the fluid flow channel 400 may be formed only by the hydrophilic membrane 52 and the hydrophobic membrane 53 by removing the aforementioned partitions 401*a* and 401*b*. That is, the front wall forming the fluid flow channel 400 is the hydrophilic membrane 52 and the rear wall is the hydrophobic membrane 53. On the other hand, when the multiphase fluid mainly consists of gas and is mixed, in a multiphase manner, with droplets such as water droplets, it is preferable to set the separation distance based on the droplet size in the multiphase fluid. By setting the separation distance smaller than the droplet size, the droplets contained in the multiphase fluid can come into contact with both the hydrophilic membrane 52 and the hydrophobic membrane 53, allowing the liquid to pass rapidly into the liquid flow channel 200.

The pore diameter and the number of pores per unit area of the hydrophilic membrane 52 and the hydrophobic membrane 53 should preferably be adjusted according to the type of gas and liquid to be separated and the supply pressure of the multiphase fluid.

Operation of the Device

The operation of the gas-liquid separation device 1 of this embodiment is described below. The following example shows a case where a multiphase fluid is supplied to each of the paired inlet/outlet ports 41*a* and 41*b*. When a multiphase fluid is first supplied to the paired inlet/outlet ports 41*a* and 41*b*, the multiphase fluid flows into the fluid flow channel 400 communicating with the inlet/outlet port 41*a*. The hatched arrow with the sign F1 in FIG. 5 indicates the flow direction of the multiphase fluid. The multiphase fluid that has flowed into the fluid flow channel 400 flows into the inflow chambers 402 and 403 through the through-holes in the partitions 401*a* and 401*b*. The multiphase fluid flowing into the inflow chambers 402 and 403 contacts both the hydrophilic membrane 52 and the hydrophobic membrane 53. At this time, the multiphase fluid flows into each membrane surface from the fluid flow channel 400 generally perpendicular to the surface, and the multiphase fluid contacts each membrane surface uniformly. Particularly for the hydrophilic membrane 52, it is preferable for the surface to be in uniform contact with the multiphase fluid because if there were dry and wet areas, gas could leak through the dry areas.

When the multiphase fluid contacts the hydrophilic membrane 52, the liquid in the multiphase fluid passes through the hydrophilic membrane 52 and flows into the liquid flow channel 200. The hatched arrow with the sign L in FIG. 5 indicates the direction of flow of the liquid passing through the hydrophilic membrane 52. The liquid flowing into the liquid flow channel 200 is discharged to the outside of the device through the pair of liquid outlet ports 21 communicating with the liquid flow channel 200.

When the multiphase fluid contacts the hydrophobic membrane 53, the gas in the multiphase fluid passes through the hydrophobic membrane 53 and flows into the gas flow channel 300. The hatched arrow with the sign G in FIG. 5 indicates the direction of flow of the gas passing through the hydrophobic membrane 53. The gas flowing into the gas flow channel 300 is discharged to the outside of the device through the pair of gas outlet ports 31 communicating with the gas flow channel 300.

In the embodiment described above, only the hydrophilic membrane 52 and the hydrophobic membrane 53 are used for gas-liquid separation to well achieve the gas-liquid separation function of separating liquids and gases in a multiphase fluid. As a result, the configuration of the device may be made extremely simple and the size of the device may be reduced compared to conventional devices. In particular, a sheet-shaped hydrophilic membrane 52 and a hydrophobic membrane 53 are arranged to sandwich the fluid flow channel 400, wherein the liquid flow channel 200 is formed adjacent to the hydrophilic membrane 52 and the gas flow channel 300 is formed adjacent to the hydrophobic membrane 53. As a result, the gas-liquid separation device 1 may be formed into a flat plate shape as shown in FIG. 1, so that it can be installed in a small space, such as a gap between apparatuses or structures, and may also be easily transported. Such a compact gas-liquid separation device 1 is extremely useful in environments such as space stations, where gas-liquid separation devices are essential but installation space is limited, because it can operate even in a microgravity field. In addition, the simple configuration allows for easy maintenance and low cost. Furthermore, the gas-liquid separation device of the present embodiment is easy to work with because it only requires a pump or other device to be connected to each port.

In the description of this embodiment, the multiphase fluid to be separated in the gas-liquid separation was assumed to be a two-phase fluid of gas and liquid, but the multiphase fluid is not limited to such. Gas-liquid separation can even be performed for multiphase fluids having a higher phase, as long as the fluid is a liquid containing a gas.

Second Embodiment

The gas-liquid separation device of the first embodiment may be integrated into a water electrolyzer that produces hydrogen gas and oxygen gas by electrolyzing water. The second embodiment, which is a water electrolyzer with an integrated gas-liquid separation device, is described below.

Figure 6:
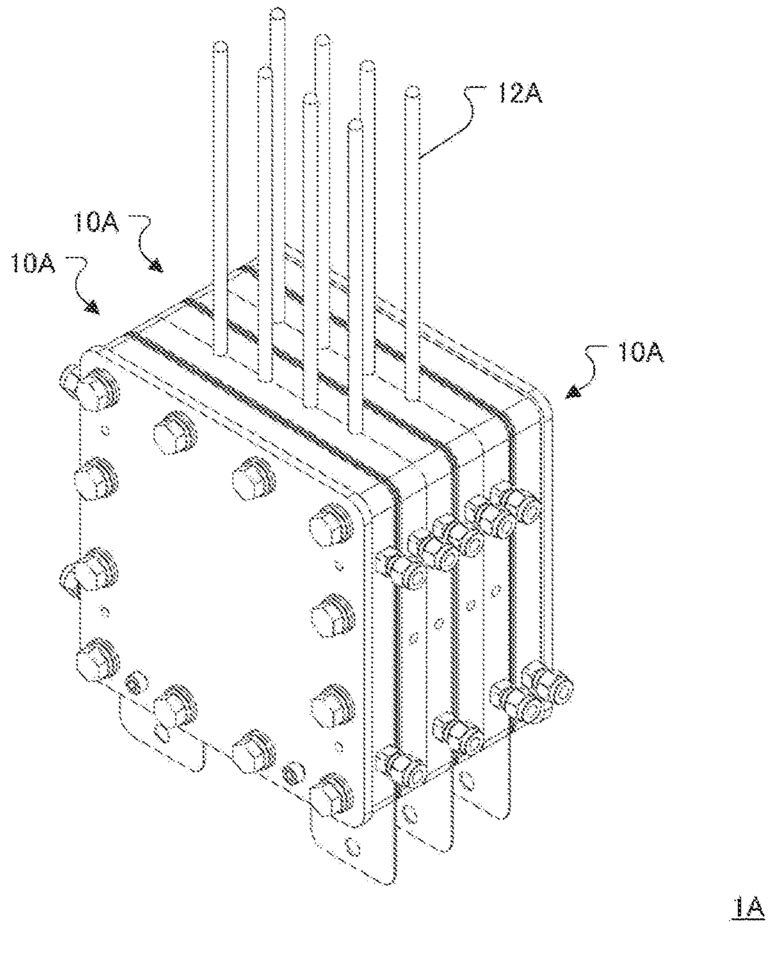
FIG. 6 is a perspective view illustrating the water electrolyzer of this embodiment.

The configuration of the water electrolyzer of this embodiment is described below. FIG. 6 is a perspective view illustrating the water electrolyzer of this embodiment. As shown in FIG. 6, the water electrolyzer 1A of this embodiment is a stacked-cell type device having a plurality of electrolytic cells 10A fastened to each other with bolts and nuts, and a plurality of heat transfer pipes (heat transfer device) 12A inserted between the electrolytic cells 10A. The heat transfer pipes 12A are so-called heat pipes in which a heat-exchange medium flows inside to exchange heat with the outside, and when inserted between the electrolytic cells 10A, heat of the electrolytic cells in contact with the heat transfer pipes can be effectively removed. The number of heat transfer pipes 12A should be selected appropriately according to the size of the equipment. It should be noted that in this embodiment three electrolytic cells 10A are combined, but it is not limited thereto and two or four or more may be combined.

The water electrolyzer 1A of this embodiment electrolyzes water into oxygen gas and hydrogen gas by means of a plurality of electrolytic cells 10A and the configuration and operation of each electrolytic cell 10A are equivalent. Therefore, the configuration and operation of one electrolytic cell 10A will be described hereafter.

Figure 7:
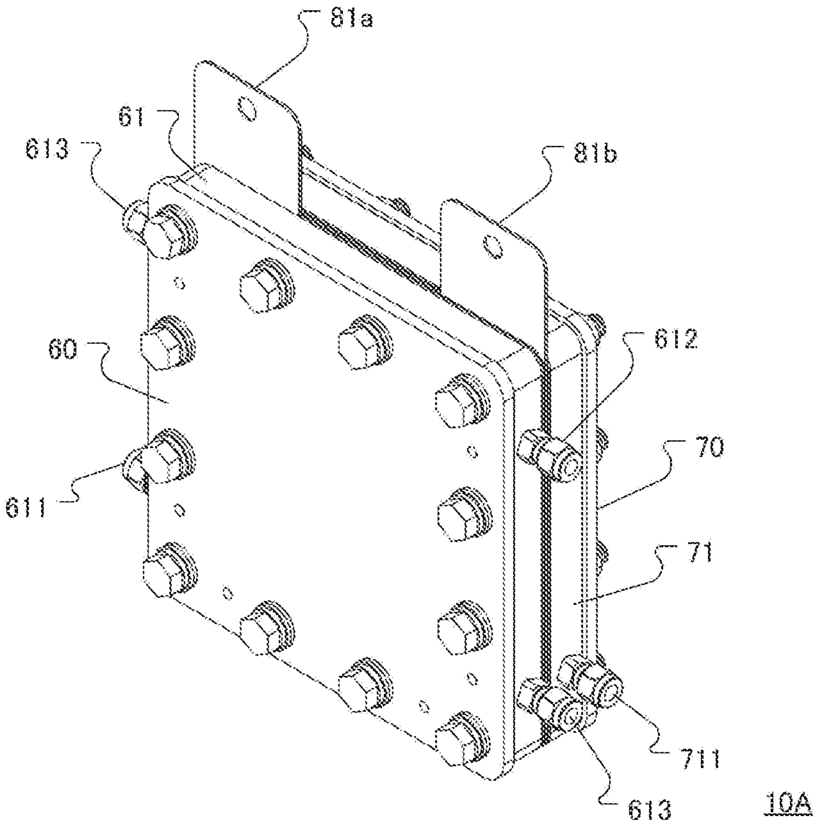
FIG. 7 is a perspective view illustrating the electrolytic cell of this embodiment.
Figure 8:
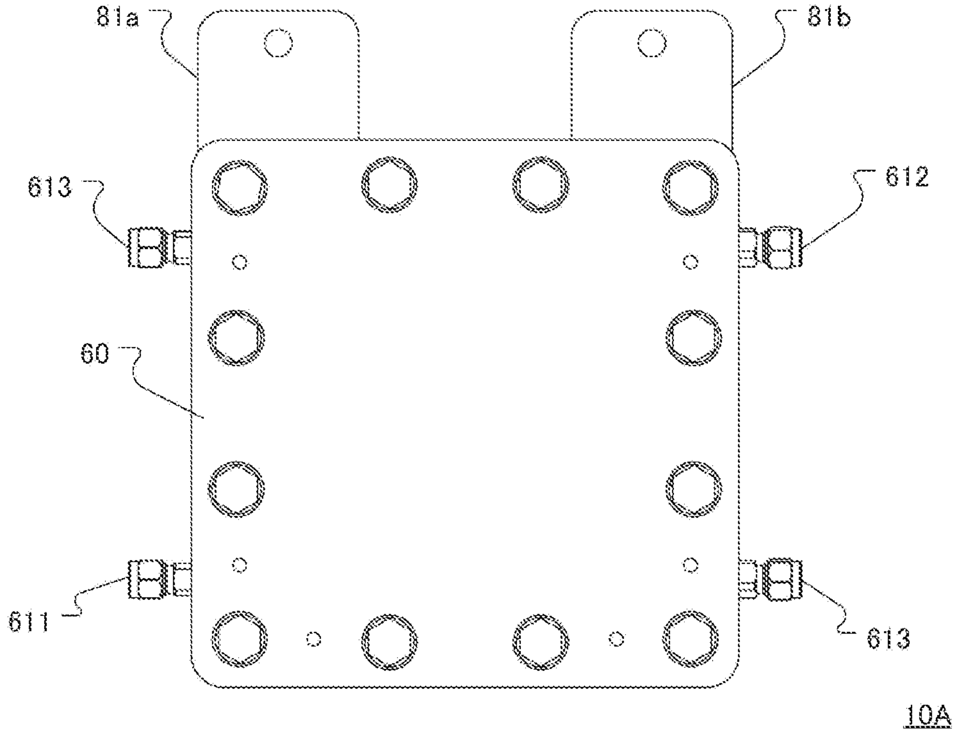
FIG. 8 is a front view illustrating the electrolytic cell of this embodiment.

First, the configuration of the electrolytic cell 10A is described in detail below. For the sake of explanation, a single electrolytic cell having end plates 60 and 70 on the front and rear sides will be described here as an example. FIGS. 7 through 10 are a perspective view, a front view, a right side view, and a left side view, respectively, illustrating the electrolytic cell of this embodiment. As shown in FIG. 7, the electrolytic cell 10A comprises an end plate 60, an intermediate plate 61, an end plate 70, an intermediate plate 71, and current collector plates 81*a* and 81*b*.

The end plates 60 and 70 are formed as square flat plates and form the front and rear walls of the electrolytic cell 10A. The electrolytic cell 10A is integrally formed into a generally rectangular shape by interposing the intermediate plate 61, the current collector plates 81*a* and 81*b*, and the intermediate plate 71 between the end plates 60 and 70, and fastening the end plates 60 and 70 with bolts and nuts. When the electrolytic cell 10A shown in FIG. 7 is stacked in a plurality, a plurality of electrolytic cells comprising intermediate plates 61 and 71 may be interposed between a pair of end plates 60 and 70.

The intermediate plates 61 and 71 are shaped like the end plates 60 and 70, but are thicker. On the side of the intermediate plate 61 are a water supply pipe 611, a drain pipe 612 and two hydrogen discharge pipes 613. Inside the intermediate plate 61 are a water supply channel 614, a drain channel 615, and a hydrogen discharge channel 616 (see FIG. 12), which are described in detail below. The water supply pipe 611 is located at the bottom of the left surface in FIG. 8 and communicates with the water supply channel 614, which supplies water to the inside of the electrolytic cell 10A. The drain pipe 612 is located at the top of the right surface in FIG. 8 and communicates with the drain channel 615, which discharges the water in the electrolytic cell 10A for recirculation. The two hydrogen discharge pipes 613 are located at the bottom of the right surface and the top of the left surface in FIG. 8, respectively, and communicate with the hydrogen discharge channel 616. The two hydrogen discharge pipes 613 discharge hydrogen gas produced by electrolysis in the electrolytic cell 10A to the outside of the electrolytic cell 10A.

Figure 9:
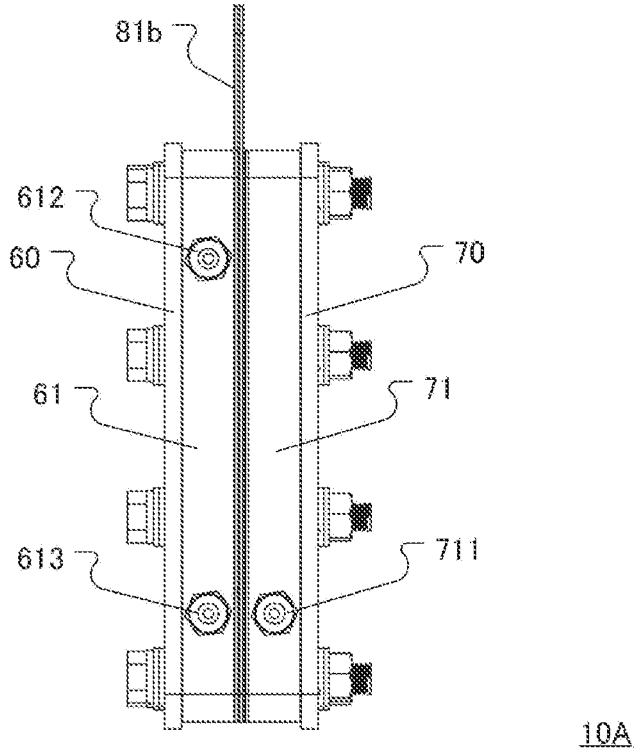
FIG. 9 is a right side view illustrating the electrolytic cell of this embodiment.
Figure 10:
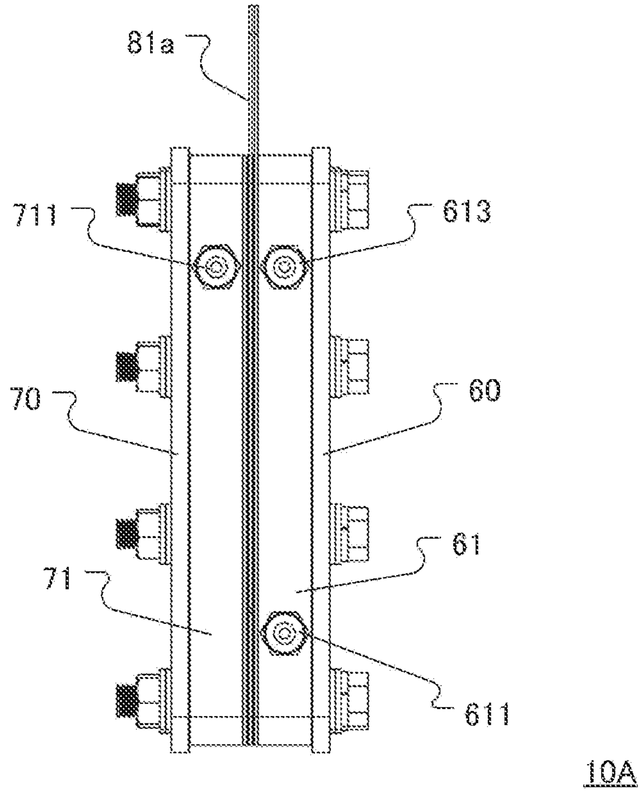
FIG. 10 is a left side view illustrating the electrolytic cell of this embodiment.

Oxygen discharge pipes 711 are disposed at the bottom of the right surface and at the top of the left surface of the intermediate plate 71, as shown in FIGS. 9 and 10. The oxygen discharge pipes 711 communicate with the oxygen discharge channel 712 (see FIG. 12), which will be described in detail later, and discharges the oxygen gas produced by electrolysis in the electrolytic cell 10A to the outside of the electrolytic cell 10A.

Figure 11:
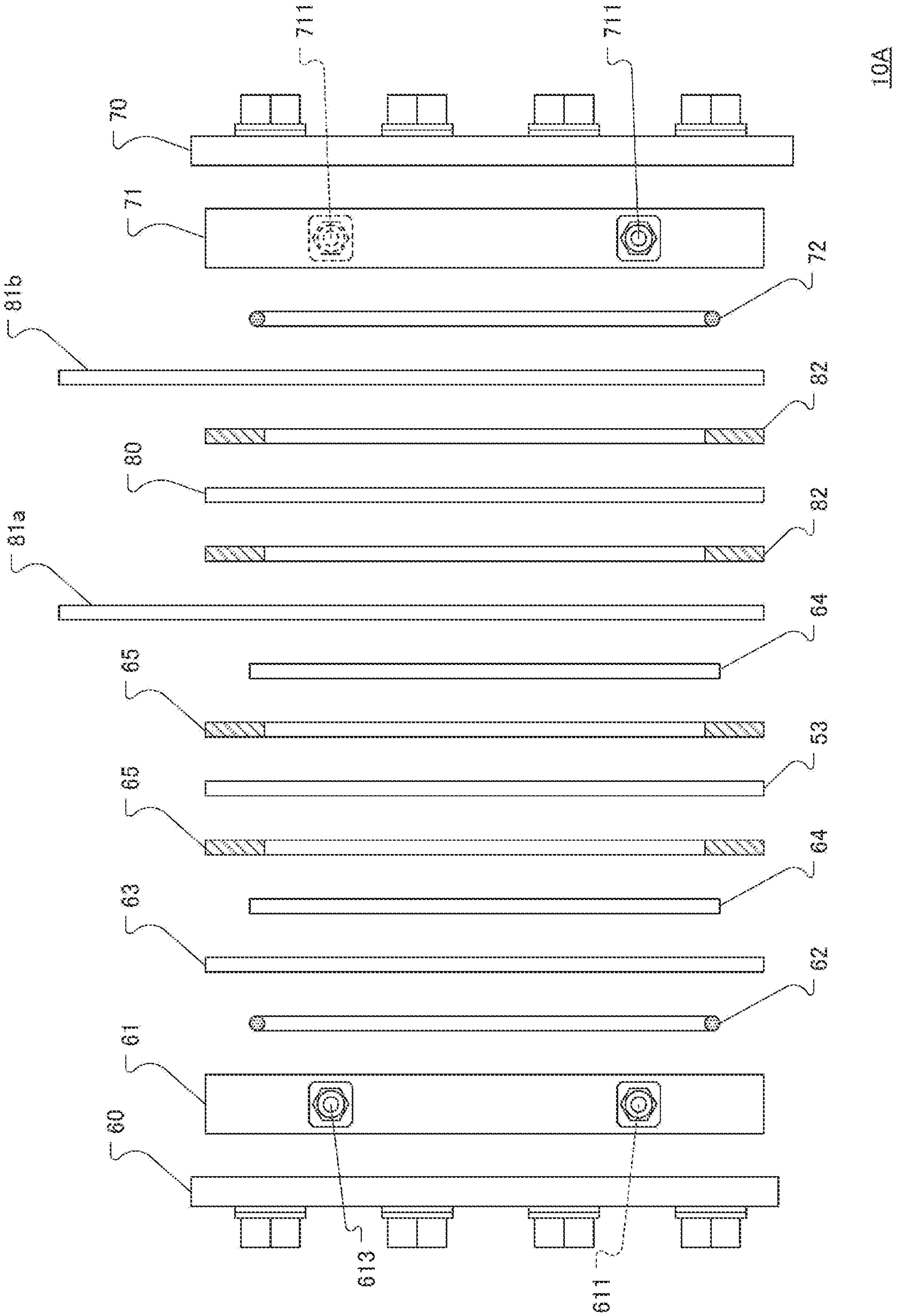
FIG. 11 is an exploded side view of the electrolytic cell.

The internal configuration of the electrolytic cell 10A is described in detail below with reference to FIG. 11. FIG. 11 is an exploded side view of the electrolytic cell. In FIG. 11, the electrolytic cell 10A is shown disassembled in a front-to-back direction, and the O-rings 62 and 72 and the gaskets 65 and 82 are partially shown in cross-section for explanation.

As shown in FIG. 11, electrolytic cell 10A has, in order from the left side in FIG. 11, that is, from the front side of the cell, end plate 60, intermediate plate 61, O-ring 62, separator 63, carbon paper 64, gasket 65, hydrophobic membrane 53, gasket 65, carbon paper 64, current collector plate 81*a*, gasket 82, MEA (Membrane and Electrode Assembly) 80, current collector plate 81*b*, O-ring 72, intermediate plate 71, and end plate 70. In FIG. 11, the left side with respect to MEA 80 is the hydrogen side where water is supplied and hydrogen gas is produced, and the right side with respect to MEA 80 is the oxygen side where oxygen gas is produced.

The MEA 80 is a generally rectangular plate-shaped member formed by sandwiching and bonding a solid polymer electrolyte membrane (hereinafter referred to as the electrolyte membrane), one side of which is a hydrogen side and the other side of which is an oxygen side, between gas diffusion electrode layers from the front and rear directions. It is preferable to use proton (H+) conducting porous electrolyte membranes, such as inorganic ceramics containing titanium hydroxide nanoparticles and proton-conducting Nafion (registered trademark).

The gas diffusion electrode layer is porous and permeable to hydrogen and oxygen gases. Materials such as porous carbon modified with Teflon (registered trademark), for example, can be used for such diffusion layers. A catalyst layer, such as platinum or gold, is provided between the gas diffusion electrode layer and the electrolyte membrane. In this embodiment, the catalyst layer is assumed to be formed on the electrolyte membrane. The electrolytic cell 10A in this embodiment is a cathode-feed type in which water is supplied only to the cathode side for electrolysis, and the water supplied to the cathode side passes through the electrolyte membrane and reaches the anode side. The gas diffusion electrode layer and the current collector plate 81*a* on the cathode side constitute the cathode-side electrode section, and the gas diffusion electrode layer and the current collector plate 81*b* on the anode side constitute the anode-side electrode section.

The MEA 80 is sandwiched or fixed between the current collector plates 81*a* and 81*b* via frame-shaped gaskets 82, which are located on both sides of the MEA 80 and connected to its peripheries. The current collector plates 81*a* and 81*b* are plate-shaped members for electrical connection to an external power supply for supplying voltage to the MEA 80, and in FIG. 8 tabs for connection to the external power supply protrude from the top. In this embodiment, each of the current collector plates 81*a* and 81*b* is configured integrally with a separator. A plurality of penetrating grooves, or slits, are provided through the separator of the current collector plate 81*a*, and in the assembled state of the electrolytic cell 10A a water channel 811 (see FIG. 12) through which water flows is formed by the plurality of slits. The water channel 811 functions as a liquid supply chamber where the cathode-side electrode section is located, and water is supplied to the MEA 80. Preferably, the water channel 811 should be shaped so that the water supplied to the MEA 80 reaches the entire electrolyte membrane surface. The water channel 811 communicates with the water supply pipe 611 through the water supply channel 614 formed in the intermediate plate 61, and communicates with the drain pipe 612 through the drain channel 615.

A plurality of slits are also provided on the separator of the current collector plate 81*b*, and in the assembled state of the electrolytic cell 10A, an oxygen flow channel 713 (see FIG. 12) is formed by the plurality of slits, into which oxygen gas produced by electrolysis flows. The oxygen flow channel 713 is connected to the oxygen discharge channel 712 formed in the adjacent intermediate plate 71, which in turn communicates with the oxygen discharge pipe 711. The separator of the current collector plate 81*b* and the intermediate plate 71 are hermetically connected with the O-ring 72, which is an elastic member, interposed therebetween.

A square-shaped hydrophobic membrane 53 is arranged on the front side of the current collector plate 81*a*. The hydrophobic membrane 53 is arranged facing and separated from the MEA 80, and forms a part of the wall of the liquid supply chamber formed by the water channel 811. The functional description of the hydrophobic membrane 53 is omitted here, as it is equivalent to that described in the first embodiment. The hydrophobic membrane 53 is fixed to the current collector plate 81*a* and the separator across the frame-shaped gaskets 65 arranged on the periphery of both sides of the hydrophobic membrane 53. The carbon paper 64 having gas permeability for diffusing gas and water is interposed between the hydrophobic membrane 53 and the current collector plate 81*a*, and through the carbon paper 64, the hydrophobic membrane 53 can contact water and hydrogen gas which is in a bubbled state in the water.

It is preferable that the distance from the hydrophobic membrane 53 to the electrolyte membrane of the MEA 80, or more specifically to the catalyst layer on the cathode side, is made equivalent to the separation distance described in the first embodiment. This allows the hydrogen gas bubbles generated and adhering to the surface of the catalyst layer to contact the hydrophobic membrane 53 and thus immediately pass through the hydrophobic membrane 53. The separation distance, as in the first embodiment, is based on the bubble size of the gas produced, and should preferably be a distance at which the bubbles contact the hydrophobic membrane 53 before breaking away from the catalyst layer. For example, the separation distance may preferably be about 1 mm, where both water and bubbles can contact the hydrophobic membrane 53.

The separator 63, which is located on the front side of the hydrophobic membrane 53, is provided with a plurality of slits forming hydrogen flow channel 631 (see FIG. 12) through which flows hydrogen gas that has passed through the hydrophobic membrane 53. The hydrogen flow channel 631 of the separator 63 is connected across an O-ring 62 to the hydrogen discharge channel 616 formed in the adjacent intermediate plate 61, and through which it communicates with the hydrogen discharge pipes 613.

Slits different from the slits forming the hydrogen flow channel 631 are formed on the separator 63, and the said slits function as water channels and connect the water flow channel formed by the water channel 811 of the separator on the current collector plate 81*a* to the water supply channel 614 formed on the intermediate plate 61. The separator 63 and the intermediate plate 61 are hermetically connected with the O-ring 62, which is an elastic member, interposed therebetween.

Operation of the Device

Figure 12:
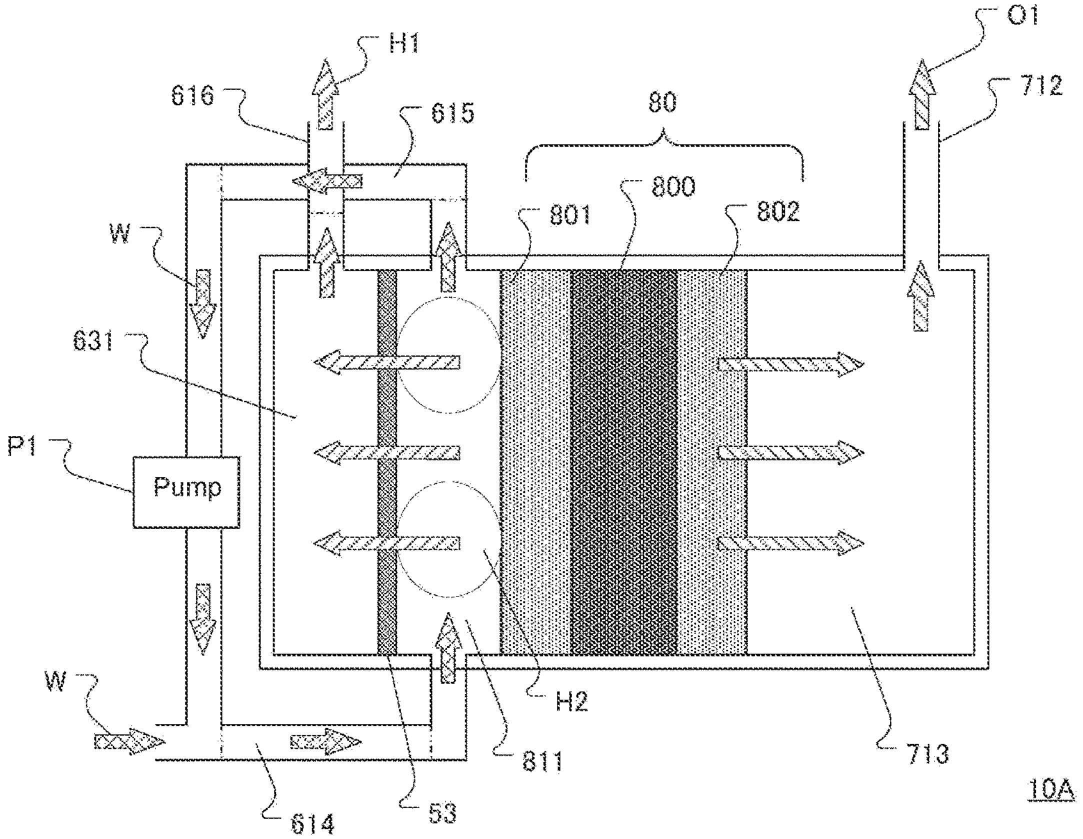
FIG. 12 is a schematic diagram describing the internal configuration of the electrolytic cell and the flow of the fluid therein.

The operation of the electrolytic cell 10A of this embodiment is described below. FIG. 12 is a schematic diagram describing the internal configuration of the electrolytic cell and the flow of the fluid therein. The chain double-dashed lines shown in the figure illustrate the joints of the flow channels. The sign P1 indicates a pump, H1 indicates hydrogen gas flow direction, H2 indicates hydrogen gas bubbles, and O1 indicates oxygen gas flow direction. The pump P1 is connected to the water supply pipe 611 and the drain pipe 612, and supplies water to the water supply pipe 611 and receives water from the drain pipe 612 to circulate and supply water to the electrolytic cell 10A. The electrolytic cell 10A shall be continuously replenished with the amount of water consumed by electrolysis from an external water supply.

As shown in FIG. 12, water supplied through the water supply pipe 611 flows into the water channel 811 through the water supply channel 614, and the water flowing into the water channel 811 reaches the entire membrane surface of the electrolyte membrane 800 of the MEA 80. The water is then electrolyzed by applying a voltage to the current collector plates 81*a* and 81*b* from an external power supply connected to them. The hydrogen gas generated by the electrolysis at the interface between the cathode-side gas diffusion electrode layer 801 and the electrolyte membrane 800 of the MEA 80, i.e., the catalyst layer, contacts the hydrophobic membrane 53 in the water channel 811 and passes therethrough to enter the hydrogen flow channel 631. Specifically, the generated hydrogen gas passes through the gas diffusion electrode layer while diffusing through the inside of the gas diffusion electrode layer, passes through the separator and the carbon paper 64 of the current collector plate 81*a*, and contacts the hydrophobic membrane 53. The hydrogen gas in the hydrogen flow channel 631 that has passed through the hydrophobic membrane 53 is discharged from the hydrogen discharge pipe 613 through the hydrogen discharge channel 616 to the outside of the electrolytic cell 10A and collected in a collecting container or the like.

Meanwhile, the water in the water channel 811 that has not been electrolyzed is discharged through the drain pipe 612 to the pump P1 through the drain channel 615 and is returned to the electrolytic cell 10A. The hydrogen gas generated by electrolysis at the interface between the anode-side gas diffusion electrode layer 802 and the electrolyte membrane 800 of the MEA 80 flows into the oxygen flow channel 713 and is discharged from the oxygen discharge pipe 711 through the oxygen discharge channel 712 to the outside of the electrolytic cell 10A and collected in a collecting container or the like.

In the water electrolyzer 1A of this embodiment described above, since the hydrophobic membrane 53 is disposed in the water channel 811, which is the cathode-side cathode chamber, the water circulates through the water channel 811, that is, between the hydrophobic membrane 53 and the MEA 80, to ensure gas-liquid separation along with electrolysis. In particular, hydrogen gas can be recovered in a good dry condition. Therefore, since the electrolytic cell is combined with a gas-liquid separation function, there is no need to prepare a separate gas-liquid separation device, and the device can be made much smaller than a water electrolyzer connected to a separate gas-liquid separation device. The device can be installed in a small space, such as a gap between other devices or structures, and can also be easily transported. Such a compact water electrolyzer 1A is extremely useful in environments such as space stations, where water electrolyzers are essential but installation space is limited, because it can operate even in a microgravity field.

When water is supplied to the cathode side on the ground, a gas phase portion exists in the water tank to absorb the pressure, but when water is electrolyzed in a microgravity field, an incompressible fluid such as water must be circulated in a closed container without a gas phase. When water is electrolyzed in an enclosed space, the gas generated in the electrolytic cell increases the pressure inside the electrolytic cell, causing a pressure imbalance between the oxygen side and the hydrogen side. If this condition is allowed to continue, the electrolyte membrane will be subjected to one-sided pressure, which may damage the membrane. In such cases, conventional devices would require a volume buffer device such as an accumulator.

However, in this embodiment, because the hydrogen gas generated by the MEA immediately passes through the hydrophobic membrane 53 and is vented, resulting in the volume buffering effect, a situation in which only one side is pressurized as a result of gas generation can be avoided.

Therefore, since there is no need to use a volume buffer device, the cost can be reduced and the size can be made smaller. In addition, since only the cathode side needs to be supplied with water, only one pump P1 is required, and the cost can be reduced and the size can be made smaller.

There are some conventional methods in which water permeates from the periphery to the center of the electrolyte membrane of the MEA. In such methods, the effective membrane area of the electrode is smaller because the water path and the reaction path are independent. In addition, because the interface is maintained by surface tension, an imbalance between the pressure on the liquid side and the pressure on the gas side may cause liquid to leak into the gas side or gas to penetrate into the liquid. However, in this embodiment, because the water supplied to the MEA 80 is supplied to the entire surface of its electrolyte membrane 800, the only distance the water must penetrate is the thickness of the membrane. This allows for a smooth and flexible water supply path, and thus the water can be easily circulated.

The electrolytic cell 10A combined with a Sabatier reactor that produces methane ($CH_4$) and water ($H_2O$) from carbon dioxide ($CO_2$) and oxygen ($O_2$) can be made into an air regenerator. Air regeneration is the process of recovering $O_2$ from $CO_2$ exhaled by astronauts. Specifically, the $CO_2$ emitted by organisms in an enclosed space is separated, concentrated, and fed into the Sabatier reactor. In the Sabatier reactor, the Sabatier reaction ($CO_2+4H_2 \rightarrow CH_4+2H_2O$) takes place, producing $CH_4$ and $H_2O$.

When the water produced by the Sabatier reaction in the Sabatier reactor is fed to the electrolytic cell 10A, hydrogen gas and oxygen gas are produced. The oxygen gas is used by organisms to breathe, and the hydrogen gas is returned to the Sabatier reactor. By repeating this cycle, oxygen can be regenerated from the carbon dioxide emitted by oxygen-breathing organisms, thus achieving air regeneration.

By stacking multiple electrolytic cells 10A as is done in the water electrolyzer 1A, the amount of hydrogen and oxygen gases produced can be increased compared to the case of only one electrolytic cell 10A. In this configuration, it is preferable that the water circulation supply paths (the water supply pipe 611 and the drain pipe 612) to and from the pump P1 are connected by a manifold so as to be shared by a plurality of electrolytic cells 10A. The same is true for the hydrogen and oxygen gas discharge paths (hydrogen discharge pipe 613 and oxygen discharge pipe 711).

First Variant Embodiment

Figure 13:
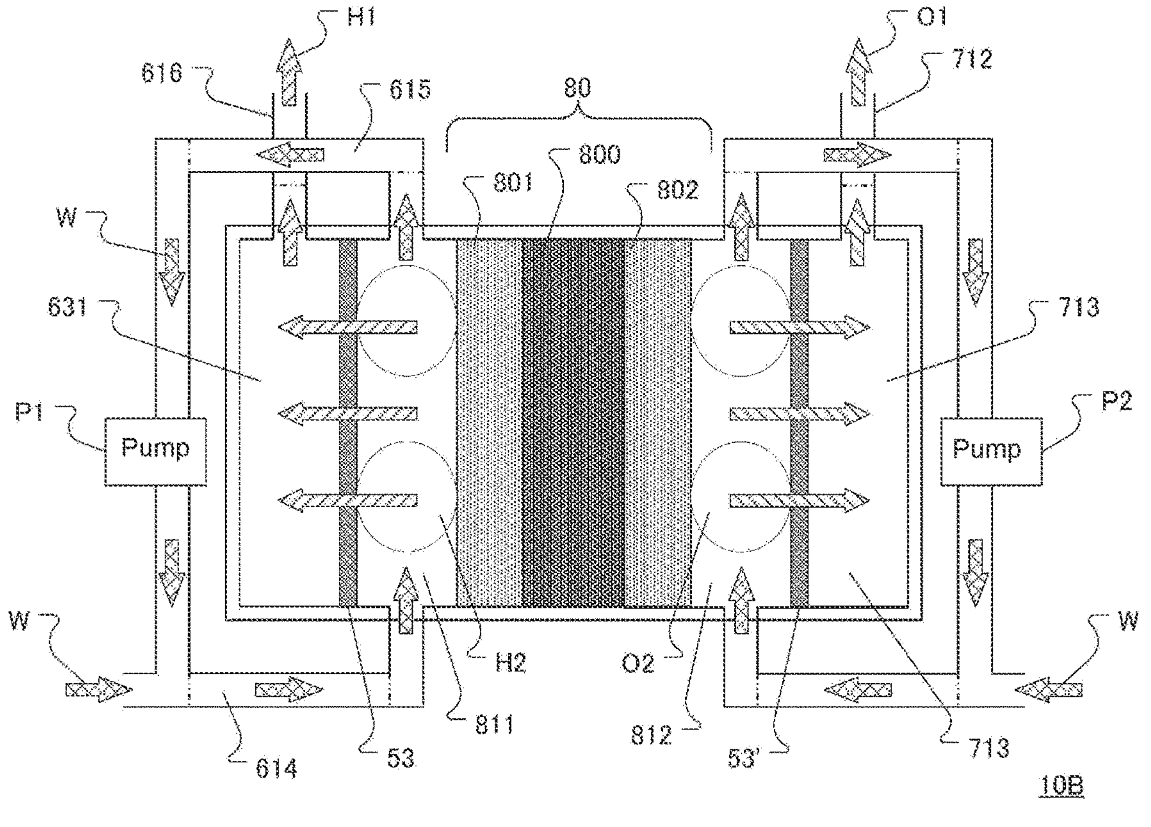
FIG. 13 is a schematic diagram describing the internal configuration and fluid flow of the electrolytic cell of the first variant embodiment.

FIG. 13 is a schematic diagram describing the internal configuration and fluid flow of the electrolytic cell of the first variant embodiment. In FIG. 13, the sign P2 indicates a pump that is the same as Pb. 02 indicates oxygen gas bubbles.

The electrolytic cell 10B of FIG. 13 differs from the electrolytic cell 10A of the second embodiment in that another hydrophobic membrane 53' is also disposed on the anode side, and a water channel 812 as a second liquid supply chamber is formed between the hydrophobic membrane 53' and the MEA 80, in which an anode-side electrode section is disposed and to which water is supplied, and the pump P2 circulates water to the water channel 812. The hydrophobic membrane 53' is identical to the hydrophobic membrane 53, but differs in that it forms a part of a wall of the water channel 812 and passes only the oxygen gas generated by electrolysis on the anode side of the electrolyte membrane 800.

In particular, the electrolytic cell 10B can be constructed arranging, in a mirror-symmetrical manner with respect to the MEA 80, an intermediate plate 61, an O-ring 62, a separator 63, a carbon paper 64, a gasket 65, a hydrophobic membrane 53, another gasket 65, another carbon paper 64, and a current collector plate 81*a* in place of the current collector plate 81*b*, the O-ring 72, and the intermediate plate 71 of FIG. 11. As a result, instead of hydrogen gas, oxygen gas flows into the flow channel associated with hydrogen gas and constructed with the mirror-symmetrically arranged components. In other words, water is circulated and supplied to the anode side, and the oxygen gas that has passed through the hydrophobic membrane 53 is discharged by the mirror-symmetrically arranged components.

By placing the hydrophobic membrane 53' on the anode side, the same effect as on the cathode side can be obtained on the anode side, and good dry oxygen gas can be recovered. In addition, since water is supplied from both sides of the MEA 80, the heat generated in the cell by electrolysis can be dissipated more efficiently.

Second Variant Embodiment

Figure 14:
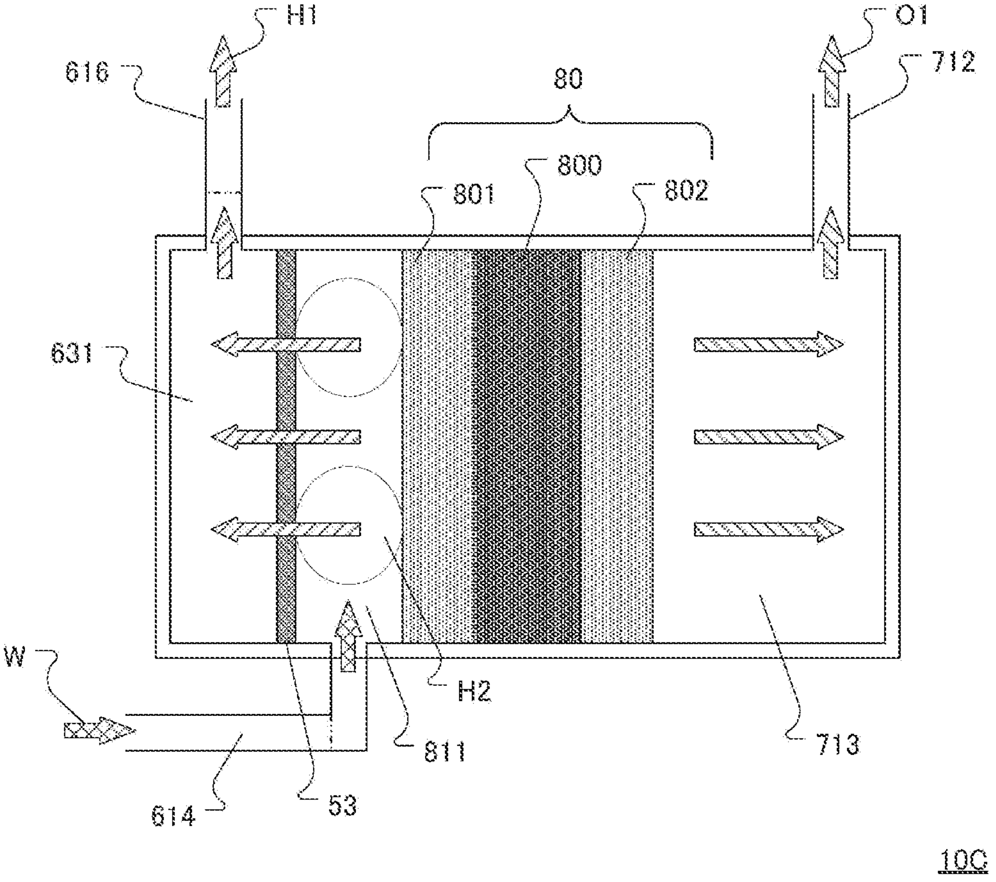
FIG. 14 is a schematic diagram describing the internal configuration and fluid flow of the electrolytic cell of the second variant embodiment.

FIG. 14 is a schematic diagram describing the internal configuration and fluid flow of the electrolytic cell of the second variant embodiment. The electrolytic cell 10C shown in FIG. 14 differs from the electrolytic cell 1A of the second embodiment in that the drain channel 615 is not provided. Therefore, the electrolytic cell 10C is a dead-end type in which the water circulation function is eliminated and all the water flowing into the water channel 811 is electrolyzed.

The amount of water required to produce oxygen for one person by electrolysis is small, about 0.5 grams per minute. On the other hand, conventional water electrolysis methods require pumps to circulate several liters of water to remove air bubbles from the electrodes and dissipate the heat generated there, a gas-liquid separation device, and electricity to run the equipment. However, in the electrolytic cell 10C of this variant embodiment, only a small amount of water (e.g., 0.5 grams per minute) is required for water electrolysis, and all of the supplied water can be electrolyzed. Therefore, compared with conventional systems, the pump P1 for circulating and supplying water and the gas-liquid separation device can be eliminated, and the oxygen gas generation system can be made much simpler, resulting in a more compact, lightweight and energy-saving system, as well as improved system reliability.

The electrolytic cell 10C can be integrated with the Sabatier reactor described in the first embodiment. In the conventional electrolytic cells, the temperature of the cells and of the Sabatier reactor was lost due to the circulation of the water. On the other hand, since the electrolytic cell 10C does not require water circulation, the reaction can be continued without lowering the temperature of the integrated Sabatier reactor. In addition, by stacking the electrolytic cell 10C and the Sabatier reactor, a very compact device can be obtained. The heat generated in the Sabatier reactor can also be used to heat the water electrolytic cell, reducing the voltage required for electrolysis.

In a system without water circulation, as in this variant embodiment, heat could build up in the cell. In such a case, the heat transfer pipes 12A, as shown in FIG. 7, may be provided in one of the intermediate plates 61 and 71 of the electrolytic cell 10C, or between the cells if the electrolytic cells 10C are stacked.

The embodiments of the present invention have been presented by way of example only, and are not intended to limit the scope of the invention. The novel embodiments described herein may be embodied in a variety of other forms, and various omissions, substitutions and modifications may be made without departing from the spirit of the invention. The embodiments and modifications are included within the scope and/or spirit of the present invention as well as the appended claims and their equivalents.

REFERENCE NUMBERS LIST

1 Gas-liquid separation device
1A Water electrolyzer
10B, 10C Electrolytic cell
12A Heat transfer pipes (Heat transfer device)
400 Fluid flow channel (Supply channel)
52 Hydrophilic membrane (Hydrophilic enclosure)
53, 53' Hydrophobic membrane (Hydrophobic enclosure)
616 Hydrogen discharge channel (Discharge channel)
712 Oxygen discharge channel (Second discharge channel)
81*a*, 81*b* Current collector plate (Cathode-side electrode section, anode-side electrode section)
800 Solid polymer electrolyte membrane
801 Cathode-side gas diffusion electrode layer (Cathode-side electrode section)
802 Anode-side gas diffusion electrode layer (Anode-side electrode section)
811, 812 Water channel (Liquid supply chamber, second liquid supply chamber)

The invention claimed is:

1. A gas-liquid separation device that separates gas and liquid from a gas-liquid multiphase fluid, comprising:
- a hydrophobic enclosure for the gas-liquid multiphase fluid formed by a hydrophobic membrane that allows only the gas in the gas-liquid multiphase fluid to pass through;
- a hydrophilic enclosure for the gas-liquid multiphase fluid formed by a hydrophilic membrane that allows only the liquid in the gas-liquid multiphase fluid to pass through; and
- a supply channel that supplies the gas-liquid multiphase fluid to the hydrophobic enclosure and the hydrophilic enclosure, wherein:
  - the hydrophobic membrane and the hydrophilic membrane are formed in sheet-shape and are disposed facing each other and separated from each other, and
  - a pair of partitions provided with a plurality of through-holes are formed between the hydrophobic membrane and the hydrophilic membrane, the pair of partitions being spaced parallel to each other, and the supply channel being defined between the pair of partitions.

2. The gas-liquid separation device of claim 1, wherein a separation distance between the hydrophobic membrane and the hydrophilic membrane is based on bubble sizes of the gas in the gas-liquid multiphase fluid.

3. The gas-liquid separation device of claim 1, wherein a separation distance between the hydrophobic membrane and the hydrophilic membrane is based on droplet sizes of the liquid in the gas-liquid multiphase fluid.

4. The gas-liquid separation device of claim 1, wherein:
- a first inlet port for the supply channel is disposed on a first surface of the gas-liquid separation device, and
- a first outlet port of the gas-liquid separation device through which the liquid in the gas-liquid multiphase fluid flows after passing through the hydrophilic membrane is disposed on a second surface of the gas-liquid separation device perpendicular to the first surface.

5. The gas-liquid separation device of claim 4, wherein a second outlet port of the gas-liquid separation device through which the gas in the gas-liquid multiphase fluid flows after passing through the hydrophobic membrane is disposed on a third surface of the gas-liquid separation device diametrically opposite the second surface.

6. The gas-liquid separation device of claim 4, wherein a second inlet port for the supply channel is disposed on a third surface of the gas-liquid separation device diametrically opposite the first surface.

7. The gas-liquid separation device of claim 1, wherein:
- a first inlet port for the supply channel is disposed on a first surface of the gas-liquid separation device, and
- a second inlet port for the supply channel is disposed on a second surface of the gas-liquid separation device diametrically opposite the first surface.

8. A gas-liquid separation method for separating liquid and gas from a gas-liquid multiphase fluid comprising the steps of:
- flowing the gas-liquid multiphase fluid between a pair of partitions that are spaced parallel to each other;
- flowing the gas-liquid multiphase fluid through through-holes provided on a first one of the pair of partitions and contacting the gas-liquid multiphase fluid with a hydrophobic membrane that allows only the gas in the gas-liquid multiphase fluid to pass through so as to allow only the gas in the gas-liquid multiphase fluid to pass through the hydrophobic membrane;
- guiding the gas that has passed through the hydrophobic membrane;
- flowing the gas-liquid multiphase fluid through through-holes provided on a second one of the pair of partitions and contacting the gas-liquid multiphase fluid with a hydrophilic membrane that allows only the liquid in the gas-liquid multiphase fluid to pass through so as to allow only the liquid in the gas-liquid multiphase fluid to pass through the hydrophilic membrane; and
- guiding the liquid that has passed through the hydrophilic membrane.

* * * * *